United States Patent
Heo

(10) Patent No.: US 10,638,157 B2
(45) Date of Patent: Apr. 28, 2020

(54) IMAGE DECODING METHOD AND APPARATUS RELYING ON INTRA PREDICTION IN IMAGE CODING SYSTEM

(71) Applicant: LG ELECTRONICS INC., Seoul (KR)

(72) Inventor: Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/340,617

(22) PCT Filed: Aug. 30, 2017

(86) PCT No.: PCT/KR2017/009466
§ 371 (c)(1),
(2) Date: Apr. 9, 2019

(87) PCT Pub. No.: WO2018/070661
PCT Pub. Date: Apr. 19, 2018

(65) Prior Publication Data
US 2019/0320200 A1    Oct. 17, 2019

Related U.S. Application Data

(60) Provisional application No. 62/406,410, filed on Oct. 11, 2016.

(51) Int. Cl.
*H04N 19/593* (2014.01)
*H04N 19/132* (2014.01)
(Continued)

(52) U.S. Cl.
CPC ......... *H04N 19/593* (2014.11); *H04N 19/132* (2014.11); *H04N 19/176* (2014.11); *H04N 19/59* (2014.11)

(58) Field of Classification Search
CPC .......................... H04N 19/593; H04N 19/132
See application file for complete search history.

(56) References Cited

U.S. PATENT DOCUMENTS 9,860,529 B2 *   1/2018  Zhang ................... H04N 19/51
10,218,957 B2 *  2/2019  Huang ................. H04N 19/597
(Continued)

FOREIGN PATENT DOCUMENTS

JP     2013-141187 A    7/2013
KR  10-2010-0081974 A   7/2010
(Continued)

OTHER PUBLICATIONS

JVET-C0043r1: Joint Video Exploration Team (JVET) of ITU-T SG 16 WP 3 and ISO/IEC JTC 1/SC29/WG 11 3rd Meeting: Geneva, CH, May 26-Jun. 1, 2016, ITRI International, "Arbitrary Reference Tier for Intra Directional Modes," pp. 1-5.
(Continued)

*Primary Examiner* — Irfan Habib
(74) *Attorney, Agent, or Firm* — Dentons US LLP

(57) ABSTRACT

An image decoding method performed by a decoding apparatus according to the present invention comprises: a step of deriving an intra prediction mode for a current block; a step of deriving upper neighboring samples of a plurality of rows for the current block, and left neighboring samples of a plurality of columns; a step of deriving one row of upper reference samples on the basis of the upper neighboring samples; a step of deriving one column of left reference samples on the basis of the left neighboring samples; and a step of generating a prediction sample for the current block by using at least one of the upper reference samples and the left reference samples in accordance with the intra prediction mode.

14 Claims, 12 Drawing Sheets

(51) Int. Cl.
*H04N 19/176* (2014.01)
*H04N 19/59* (2014.01)

(56) References Cited

U.S. PATENT DOCUMENTS

| | | | | |
|---|---|---|---|---|
| 10,257,531 | B2* | 4/2019 | Lee | H04N 19/46 |
| 2008/0304760 | A1* | 12/2008 | Lee | H04N 19/597 |
| | | | | 382/238 |
| 2010/0239002 | A1* | 9/2010 | Park | H04N 19/176 |
| | | | | 375/240.12 |
| 2012/0128068 | A1* | 5/2012 | Thoreau | H04N 19/105 |
| | | | | 375/240.12 |
| 2012/0314767 | A1* | 12/2012 | Wang | H04N 19/105 |
| | | | | 375/240.12 |
| 2013/0156099 | A1* | 6/2013 | Sasai | H04N 19/42 |
| | | | | 375/240.03 |
| 2014/0010305 | A1* | 1/2014 | Mironovich | H04N 19/597 |
| | | | | 375/240.16 |
| 2014/0022343 | A1* | 1/2014 | Chen | H04N 19/70 |
| | | | | 348/43 |
| 2014/0376633 | A1* | 12/2014 | Zhang | H04N 19/105 |
| | | | | 375/240.16 |
| 2015/0085929 | A1* | 3/2015 | Chen | H04N 19/52 |
| | | | | 375/240.13 |
| 2015/0085935 | A1* | 3/2015 | Chen | H04N 19/597 |
| | | | | 375/240.16 |
| 2015/0208086 | A1* | 7/2015 | Chen | H04N 19/597 |
| | | | | 375/240.17 |
| 2015/0358599 | A1* | 12/2015 | Lin | H04N 19/597 |
| | | | | 348/47 |
| 2015/0381986 | A1* | 12/2015 | Chen | H04N 19/597 |
| | | | | 348/43 |
| 2016/0134857 | A1* | 5/2016 | An | H04N 19/597 |
| | | | | 348/43 |
| 2016/0241869 | A1* | 8/2016 | Choi | H04N 19/70 |
| 2016/0277758 | A1* | 9/2016 | Ikai | H04N 19/597 |
| 2017/0155920 | A1* | 6/2017 | Park | H04N 19/105 |
| 2018/0343469 | A1* | 11/2018 | Jin | H04N 19/593 |

FOREIGN PATENT DOCUMENTS

| | | |
|---|---|---|
| KR | 10-2012-0103517 A | 9/2012 |
| KR | 10-2013-0118219 A | 10/2013 |
| KR | 10-2014-0029520 A | 3/2014 |
| RU | 2587465 C2 | 6/2016 |
| WO | 2016066093 A1 | 5/2016 |

OTHER PUBLICATIONS

JVET-C0071: Joint Video Exploration Team (JVET) of ITU-T SG 16 WP 3 and ISO/IEC JTC 1/SC29/WG 11 3rd Meeting: Geneva, CH, May 26-Jun. 1, 2016, Peking University, Microsoft Corp., "Multiple line-based intra prediction," pp. 1-6.

JVET-D0149: Joint Video Exploration Team (JVET) of ITU-T SG 16 WP 3 and ISO/IEC JTC 1/SC29/WG 11 4th Meeting: Chengdu, CN, Oct. 15-21, 2016, Peking University, Microsoft Corp., "EE6: Multiple line-based intra prediction," pp. 1-5.

JVET-C0043: Joint Video Exploration Team (JVET) of ITU-T SG 16 WP 3 and ISO/IEC JTC 1/SC 291WG 11 3rd Meeting: Geneva, CH, May 26-Jun. 1, 2016, ITRI International, "Arbitrary Reference Tier for Intra Directional Modes," pp. 1-3.

* cited by examiner

● : Integer pixel position
X : Corresponding position in each reference sample (A, B, C, D)

D1: left integer pixel sample value of X
D2: right integer pixel sample value of X
d1: distance between X and D2
d2: distance between X and D1

Sample value of X = (D1*d1+D2*d2+(d1+d2)/2)/(d1+d2)

IMAGE DECODING METHOD AND APPARATUS RELYING ON INTRA PREDICTION IN IMAGE CODING SYSTEM

CROSS-REFERENCE TO RELATED APPLICATIONS

This application is the National Stage filing under 35 U.S.C. 371 of International Application No. PCT/KR2017/009466, filed on Aug. 30, 2017, which claims the benefit of U.S. Provisional Application No. 62/406,410 filed on Oct. 11, 2016, the contents of which are all hereby incorporated by reference herein in their entirety.

BACKGROUND OF THE INVENTION

Field of the Invention

The present invention relates to image coding technology, and more particularly, to an image decoding method and device according to intra-prediction in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and device for enhancing image coding efficiency.

The present invention further provides an intra-prediction method and device for generating a reference sample based on a plurality of neighboring samples of a current block and performing based on the reference sample.

In an aspect, a method of decoding an image performed by a decoding device is provided. The method includes deriving an intra-prediction mode of a current block; deriving a plurality of rows of upper neighboring samples and a plurality of columns of left neighboring samples of the current block; deriving one row of upper reference samples based on the upper neighboring samples; deriving one column of left reference samples based on the left neighboring samples; and generating a prediction sample of the current block using at least one of the upper reference samples and the left reference samples according to the intra-prediction mode.

In another aspect, a decoding device for decoding an image is provided. The decoding device includes an entropy decoding unit for obtaining prediction information on a current block; and a prediction unit for deriving an intra-prediction mode of the current block, deriving a plurality of rows of upper neighboring samples and a plurality of columns of left neighboring samples of the current block, deriving one row of upper reference samples based on the upper neighboring samples, deriving one column of left reference samples based on the left neighboring samples, and generating a prediction sample of the current block using at least one of the upper reference samples and the left reference samples according to the intra-prediction mode.

In another aspect, a method of encoding video performed by an encoding device is provided. The method includes determining an intra-prediction mode of a current block; deriving a plurality of rows of upper neighboring samples and a plurality of columns of left neighboring samples of the current block; deriving one row of upper reference samples based on the upper neighboring samples; deriving one column of left reference samples based on the left neighboring samples; generating a prediction sample of the current block using at least one of the upper reference samples and the left reference samples according to the intra-prediction mode; and generating, encoding, and outputting prediction information of the current block.

In another aspect, a video encoding device is provided. The encoding device includes a prediction unit for determining an intra-prediction mode of a current block, deriving a plurality of rows of upper neighboring samples and a plurality of columns of left neighboring samples of the current block, extracting one row of upper reference samples based on the upper neighboring samples, extracting one column of left reference samples based on the left reference samples, and generating a prediction sample of the current block using at least one of the upper reference samples and the left reference samples according to the intra-prediction mode; and an entropy encoding unit for generating, encoding, and outputting prediction information of the current block.

Advantageous Effects

According to the present invention, a reference sample of a current block can be derived based on a plurality of neighboring samples, and by performing intra-prediction based on the reference sample, prediction accuracy of the current block can be improved, thereby improving overall coding efficiency.

According to the present invention, a reference sample can be derived based on a plurality of neighboring samples positioned in a prediction direction of an intra-prediction mode of a current block, and by performing intra-prediction based on the reference sample, prediction accuracy of the current block can be improved, thereby improving overall coding efficiency.

According to the present invention, weights of a plurality of neighboring samples can be derived, a reference sample can be derived based on the weights and the neighboring samples, and by performing intra-prediction based on the reference sample, prediction accuracy of the current block can be improved, thereby improving overall coding efficiency.

DESCRIPTION OF EXEMPLARY EMBODIMENTS

Figure 1:
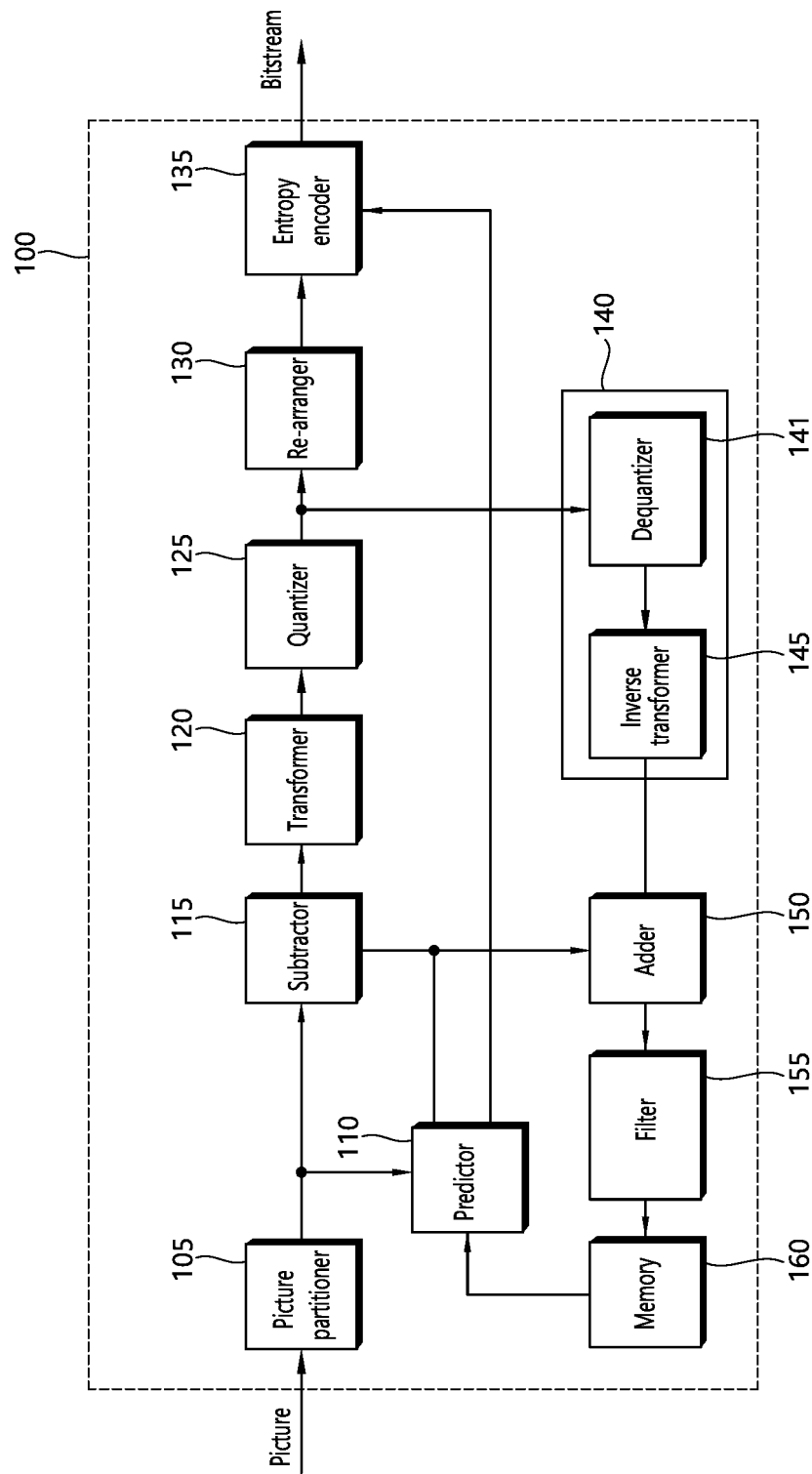
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pa may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 may include a picture partitioner 105, a predictor 110, a subtractor 115, a transformer 120, a quantizer 125, a re-arranger 130, an entropy encoder 135, a residual processor 140, an adder 150, a filter 155, and a memory 160. The residual processor 140 may include a dequantizer 141, an inverse transformer 142.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present invention may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and restoration, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 125 may quantize the transform coefficients to generate quantized transform coefficients.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video restoration in addition to the quantized transform coefficients. The entropy-encoded information may be transmitted or stored in unit of a network abstraction layer (NAL) in a bitstream form.

The dequantizer 141 dequantizes values (transform coefficients) quantized by the quantizer 125 and the inverse transformer 142 inversely transforms values dequantized by the dequantizer 141 to generate a residual sample.

The adder 150 adds a residual sample to a prediction sample to reconstruct a picture. The residual sample may be added to the prediction sample in units of a block to generate a restored block. Although the adder 150 is described as a separate component, the adder 150 may be a part of the predictor 110. Meanwhile, the adder 150 may be referred to as a reconstructor or restored block generator.

The filter 155 may apply deblocking filtering and/or a sample adaptive offset to the restored picture. Artifacts at a block boundary in the restored picture or distortion in quantization may be corrected through deblocking filtering and/or sample adaptive offset. Sample adaptive offset may be applied in units of a sample after deblocking filtering is completed. The filter 155 may apply an adaptive loop filter (ALF) to the restored picture. The ALF may be applied to the restored picture to which deblocking filtering and/or sample adaptive offset has been applied.

The memory 160 may store a restored picture (decoded picture) or information necessary for encoding/decoding. Here, the restored picture may be the restored picture filtered by the filter 155. The stored restored picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
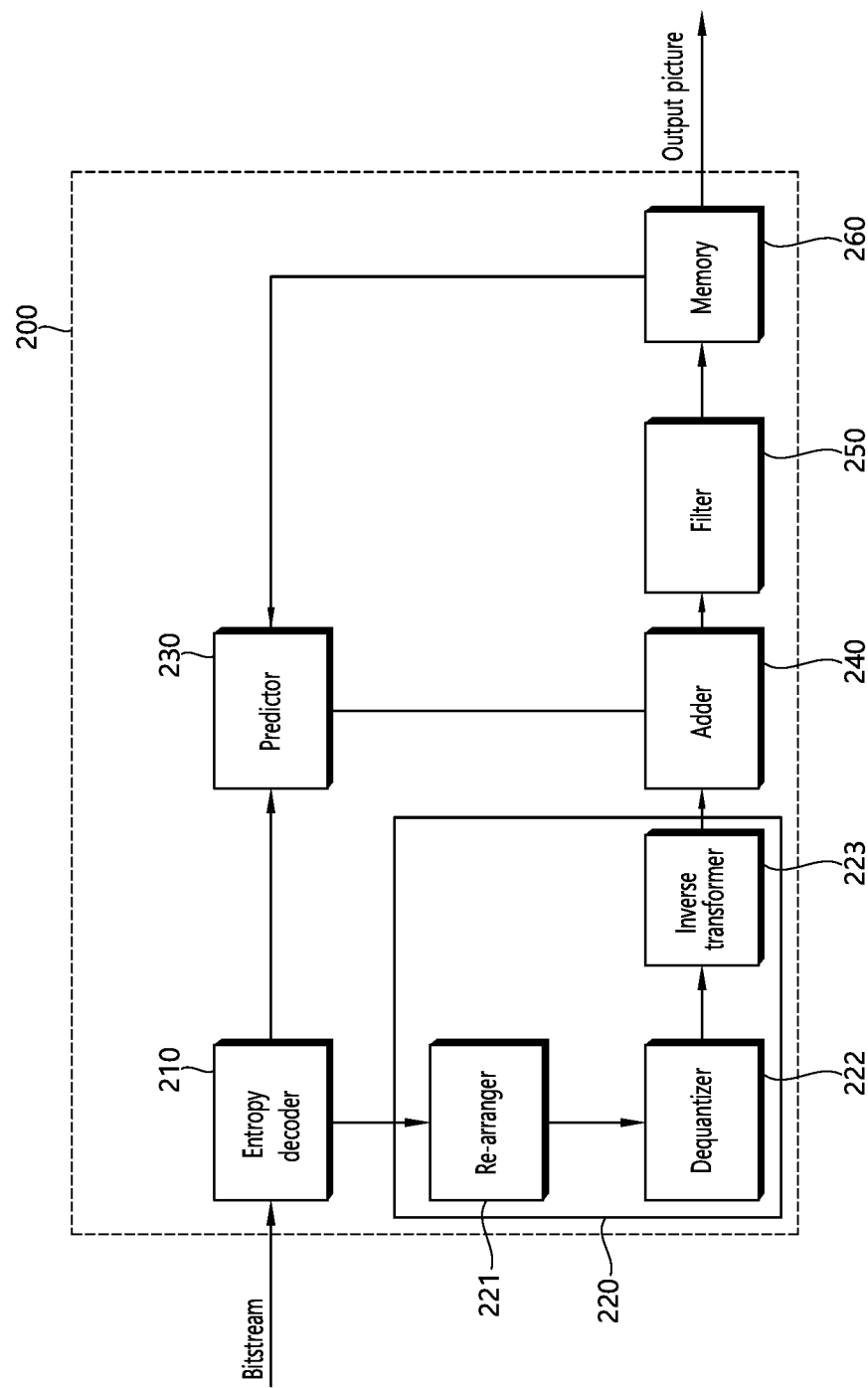
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 may include an entropy decoder 210, a residual processor 220, a predictor 230, an adder 240, a filter 250, and a memory 260. The residual processor 220 may include a re-arranger 221, a dequantizer 222, and an inverse transformer 223.

When a bitstream including video information is input, the video decoding device 200 may reconstruct a video in association with a process by which video information is processed in the video encoding device.

For example, the video decoding device 200 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video restoration or picture restoration. For example, the entropy decoder 210 may decode information in the bitstream based on a coding method such as exponential Golomb encoding, CAVLC, CABAC, or the like, and may output a value of a syntax element required for video restoration and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a restored spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a restored spatial neighboring block and/or a motion vector corresponding to a Col block which is a temporal neighboring block. That is, the motion vector of the restored spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a restored sample. Although the adder 240 is described as a separate component, the adder 240 may be a part of the predictor 230. Meanwhile, the adder 240 may be referred to as a reconstructor or restored block generator.

The filter 250 may apply deblocking filtering, sample adaptive offset and/or ALF to the restored picture. Here, sample adaptive offset may be applied in units of a sample after deblocking filtering. The ALF may be applied after deblocking filtering and/or application of sample adaptive offset.

The memory 260 may store a restored picture (decoded picture) or information necessary for decoding. Here, the restored picture may be the restored picture filtered by the filter 250. For example, the memory 260 may store pictures used for inter-prediction. Here, the pictures used for inter-prediction may be designated according to a reference picture set or a reference picture list. A restored picture may be used as a reference picture for other pictures. The memory 260 may output restored pictures in an output order.

As described above, when intra-prediction of the current block is performed, the intra-prediction may be performed based on neighboring samples that have already been encoded/decoded at a decoding time point of the current block. That is, a prediction sample of the current block may be restored using left neighboring samples and upper neighboring samples of the already restored current block. The left neighboring samples and the upper neighboring samples may be represented as shown in FIG. 3.

Figure 3:
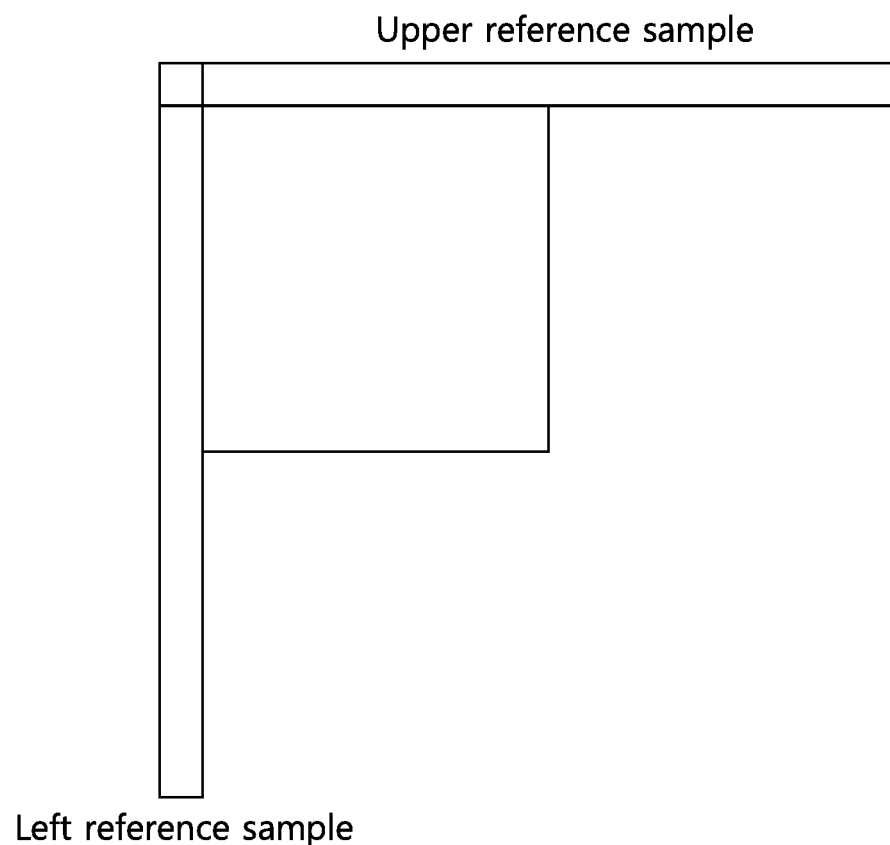
FIG. 3 illustrates left neighboring samples and upper neighboring samples used for intra-prediction of a current block.

FIG. 3 illustrates the left neighboring samples and upper neighboring samples used for intra-prediction of the current block. When intra-prediction is performed in the current block, an intra-prediction mode of the current block may be derived, and a prediction sample of the current block may be generated using at least one of the left neighboring samples and the upper neighboring samples according to the intra-prediction mode. Here, the intra-prediction modes may include, for example, two non-directional intra-prediction modes and 33 directional intra-prediction modes. Here, 0th and 1st intra-prediction modes are the non-directional intra-prediction modes, the 0th intra-prediction mode indicates an intra-planar mode, and the 1st intra-prediction mode indicates an intra-DC mode. The remaining 2nd to 34th intra-prediction modes are the directional intra-prediction modes and each have prediction directions. The directional intra-prediction mode may be referred to as an intra-angular mode. A prediction sample value of a current sample of a current block may be derived based on the intra-prediction mode of the current block.

For example, when the intra-prediction mode of the current block is one of the directional intra-modes, a value of a neighboring sample positioned in a prediction direction of the intra-prediction mode of the current block may be derived as a prediction sample value of the current sample based on the current sample in the current block. When a neighboring sample of an integer sample unit is not positioned in a prediction direction based on the current sample, by deriving a sample of a fractional sample unit at a corresponding prediction direction position based on interpolation of neighboring samples of an integer sample unit positioned in the vicinity of the corresponding prediction direction, a sample value of the fractional sample unit may be derived as a prediction sample value of the current sample.

As described above, when a prediction sample of the current block is generated using at least one of the left neighboring samples and the upper neighboring samples, as a distance between the prediction sample and the neighboring sample increases, prediction accuracy may be lowered. Further, because a prediction sample is generated with reference to only one row or column of neighboring samples, when noise information is included in samples adjacent to the current block, prediction accuracy of the current block is greatly deteriorated, and thus overall coding efficiency may be deteriorated. Therefore, the present invention suggests a method of generating reference samples based on a plurality of left neighboring samples and upper neighboring samples, i.e., a plurality of columns of left neighboring samples and a plurality of rows of upper neighboring samples and performing intra-prediction based on the generated reference samples in order to improve prediction accuracy of intra-prediction and improve coding efficiency. In the following embodiments, a method of generating one left reference sample (or upper reference sample) based on four left neighboring samples (or upper neighboring samples) is described, but the random n (N>1) number of left neighboring samples (or upper neighboring samples) may be used and thus the left reference sample (or the upper reference sample) may be generated.

Figure 4:
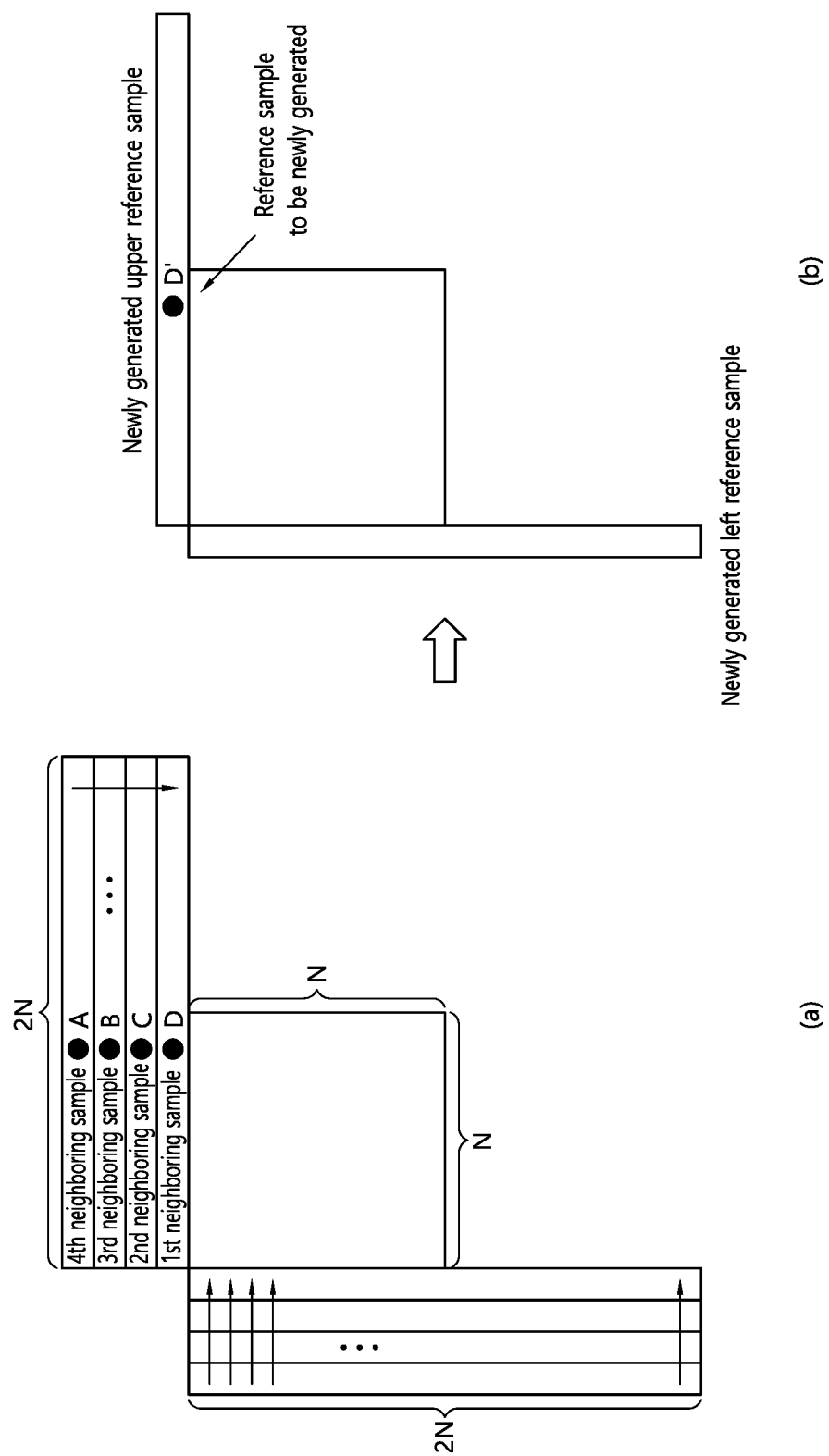
FIG. 4 illustrates an example of deriving a reference sample based on a plurality of neighboring samples of a current block.

FIG. 4 illustrates an example of deriving a reference sample based on a plurality of neighboring samples of a current block. Referring to FIG. 4, when a size of the current block is an N×N size, the 2N number of upper reference samples may be generated based on the upper neighboring samples in an area of 2N×4 size, and the 2N number of left reference samples may be generated based on left neighboring samples in an area of 4×2N size. Specifically, one upper reference sample positioned in a specific column may be generated based on four upper neighboring samples positioned in the specific column among the upper neighboring samples, and one left reference sample positioned in a specific row may be generated based on four left neighboring samples positioned in the specific row among the left neighboring samples. For example, an average value of sample values of four upper neighboring samples positioned in an x-th column among the upper neighboring samples may be derived as a sample value of upper reference samples of the x-th column. Further, an average value of sample values of four left neighboring samples positioned in a y-th column among the left neighboring samples may be derived as a sample value of the y-th row of left reference samples.

As described above, the same weight {¼, ¼, ¼, ¼} may be allocated to neighboring samples used for generating a reference sample, but in order words, a weight of neighboring samples for generating the reference sample may be the same as ¼, but prediction accuracy may be reduced in proportion to a distance between the neighboring sample and the current block to be encoded. Therefore, when the four upper neighboring samples are represented as a first row of upper neighboring sample, a second row of upper neighboring sample, a third row of upper neighboring sample, and a fourth row of upper neighboring sample in an upward direction from the downside, a weight of the first row of upper neighboring sample may be allocated as ½, a weight of the second row of upper neighboring sample may be allocated as ¼, and a weight of the third row of upper neighboring sample and the fourth row of upper neighboring sample may be allocated as ⅛. Thereby, samples in which a distance to the current block is small among the upper neighboring samples may be much used for generating the upper reference sample. Further, when the four left neighboring samples are represented as a first column of left neighboring sample, a second column of left neighboring sample, a third column of left neighboring sample, and a fourth column of left neighboring sample in a direction from the right to the left, a weight of the first column of left neighboring sample may be allocated as ½, a weight of the second column of left neighboring sample may be allocated as ¼, and a weight of the third column of left neighboring sample and the fourth column of left neighboring sample may be allocated as ⅛.

Further, in another example, a weight of the first row of upper neighboring sample and the second row of upper neighboring sample may be allocated as ⅖, and a weight of the third row of upper neighboring sample and the fourth row of upper neighboring sample may be allocated as ⅒. Further, a weight of the first column of left neighboring sample may be allocated as ½, a weight of the second column of left neighboring sample may be allocated as ¼, and a weight of the third column of left neighboring sample and the fourth column of left neighboring sample may be allocated as ⅛.

Further, a method of allocating a weight to each neighboring sample may include various methods other than the above-mentioned example. For example, a weight of each neighboring sample may be allocated according to a distance between the each neighboring sample and the current block, a weight of the each neighboring sample may be allocated according to a size of the current block, and a weight of the each neighboring sample may be allocated according to a quantization parameter (QP) of the current block. Further, a weight of the each neighboring sample may be allocated based on various criteria. The upper reference sample may be derived based on the upper neighboring samples and a weight allocated to each of the upper neighboring samples. Further, the left reference sample may be derived based on the left neighboring samples and a weight allocated to each of the left neighboring samples. Further, the upper reference sample or the left reference sample may be derived based on the following equation.

$$D'=w1*D+w2*C+w3*B+w4*A \qquad \text{[Equation 1]}$$

where D' may represent the upper reference sample (or left reference sample), w1 may represent a weight of the first row of upper neighboring sample (or the first column of left neighboring sample), w2 may represent a weight of the second row of upper neighboring sample (or the second column of left neighboring sample), w3 may represent a weight of the third row of upper neighboring sample (or the third column of left neighboring sample), and w4 may represent a weight of the fourth row of upper neighboring sample (or the fourth column of left neighboring sample). Further, D may represent the first row of upper neighboring sample (or the first column of left neighboring sample), C may represent the second row of upper neighboring sample (or the second column of left neighboring sample), B may represent the third row of upper neighboring sample (or the third column of left neighboring sample), and A may represent the fourth row of upper neighboring sample (or the fourth column of left neighboring sample).

As described above, reference samples of the current block may be derived based on the 2N number of neighboring samples of a plurality of columns or rows, but reference samples may be derived based on neighboring samples more than the 2N number of neighboring samples of a plurality of columns or rows according to a prediction direction of the current block.

Figure 5:
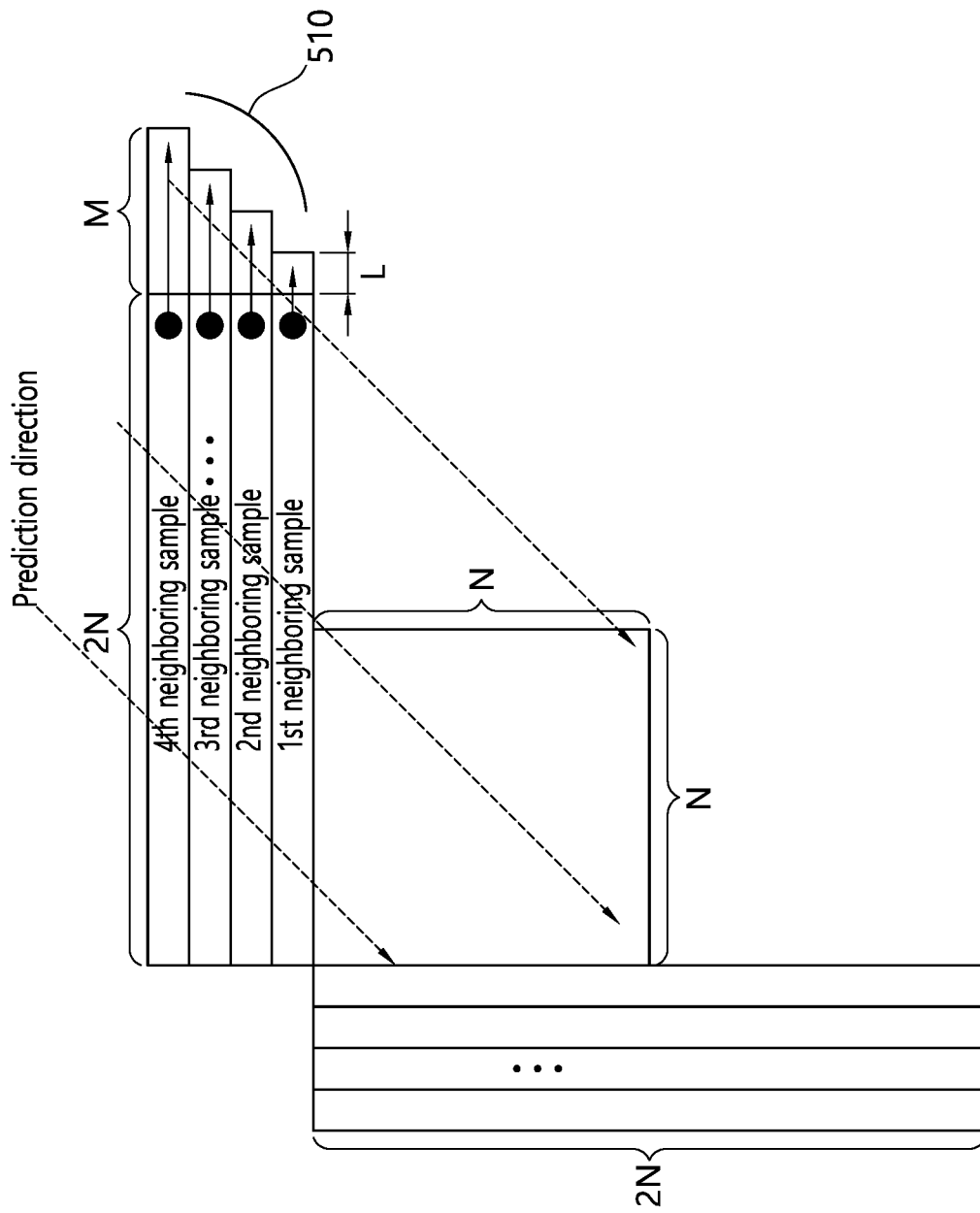
FIG. 5 illustrates an example of deriving a reference sample based on a plurality of neighboring samples of a current block.

FIG. 5 illustrates an example of deriving a reference sample based on a plurality of neighboring samples of a current block. Referring to FIG. 5, an intra-prediction mode of the current block may be derived, and a prediction direction according to the intra-prediction mode may be derived. Reference samples of the current block may be generated based on neighboring samples positioned in the prediction direction. In this case, as shown in FIG. 5, the prediction direction of the current block may be directed from the upper right side to the lower left side, and upper neighboring samples positioned in an additional area 510 shown in FIG. 5 may be required for prediction of the current block. In other words, the L number of upper neighboring samples and the 2N number of upper neighboring samples positioned in the first row may be required for prediction of the current block. Further, the M number of upper neighboring samples and the 2N number of upper neighboring samples positioned in the fourth row may be required for prediction of the current block. Therefore, neighboring samples positioned in the additional area 510 may be generated, and reference samples of the current block may be generated based on neighboring samples positioned in a prediction direction of the current block among neighboring samples including the additional area 510. Samples positioned in the additional area 510 may be generated by padding a sample value of a rightmost upper neighboring sample among upper neighboring samples of each row. That is, a sample value of the samples positioned in the additional area 510 may be derived to be equal to a sample value of the rightmost upper neighboring sample among the upper neighboring samples of each row. Although an example of generating samples positioned in an additional area of the left neighboring samples is not shown in the drawing, similar to an example of generating samples positioned in the additional area 510, samples positioned in an additional area of the left neighboring samples may be generated. Specifically, samples positioned in the additional area of the left neighboring samples may be generated by padding a sample value of a lowermost left neighboring sample among left neighboring samples of each column.

When upper neighboring samples including upper neighboring samples of the additional area 510 are derived, upper reference samples of the current block may be generated based on the upper neighboring samples. An embodiment in which the upper reference samples are generated may be shown in the following figure.

Figure 6:
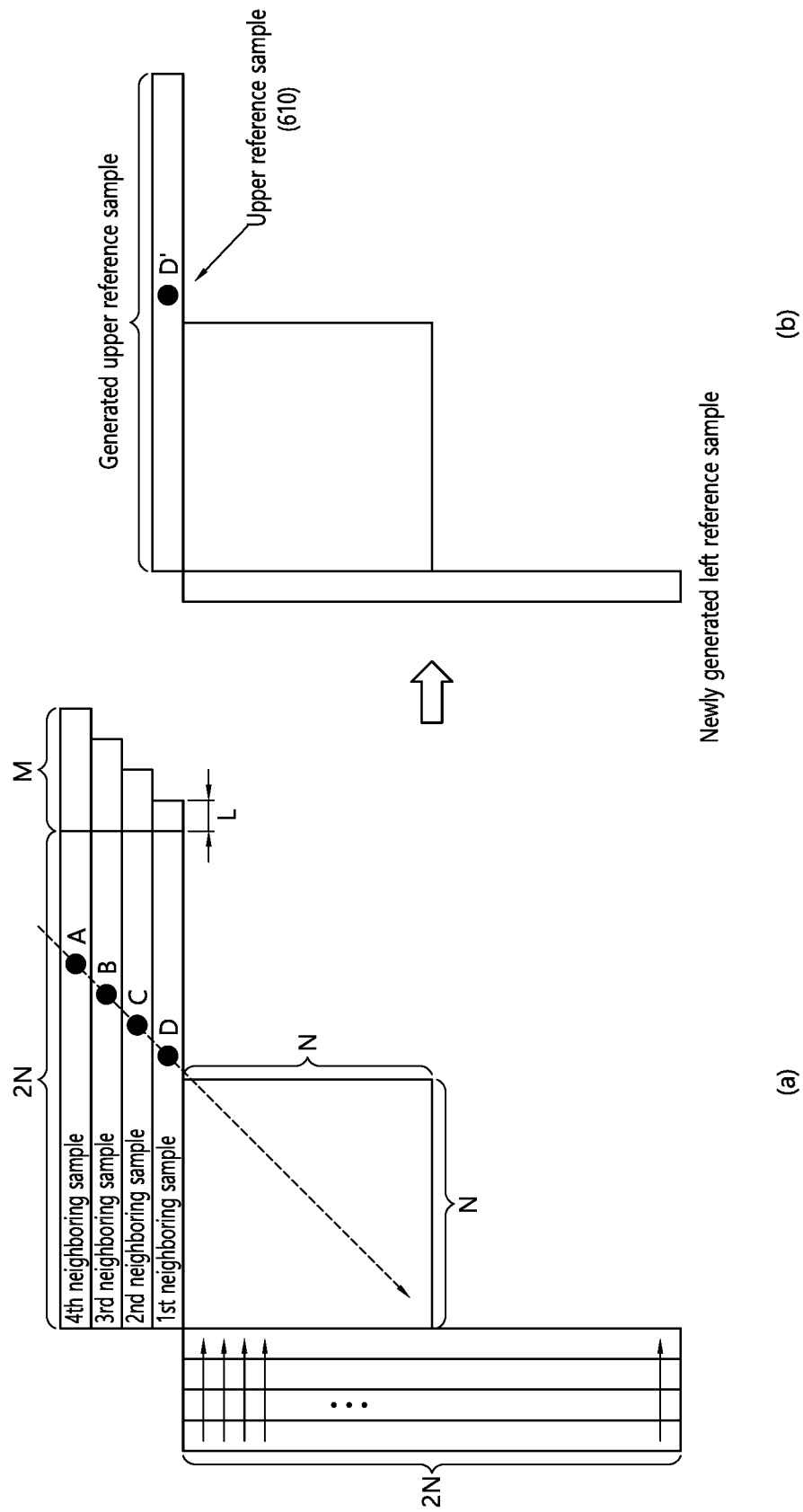
FIG. 6 illustrates an example of generating upper reference samples of the current block based on upper neighboring samples including additionally generated upper neighboring samples.

FIG. 6 illustrates an example of generating upper reference samples of the current block based on upper neighboring samples including additionally generated upper neighboring samples. FIG. 6(b) illustrates a position of a newly generated upper reference sample. In this case, at a position of an upper reference sample 610, the upper neighboring samples at positions corresponding to a prediction direction of the current block may be used for generating the upper reference sample 610. For example, as shown in FIG. 6(a), at the position of the upper reference sample 610, an upper neighboring sample A, an upper neighboring sample B, an upper neighboring sample C, and an upper neighboring sample D, which are the upper neighboring samples at positions corresponding to the prediction direction of the current block may be used for generating the upper reference sample 610. When all positions of the upper neighboring sample A, the upper neighboring sample B, the upper neighboring sample C, and the upper neighboring sample D are integer sample positions, i.e., when all of the upper neighboring sample A, the upper neighboring sample B, the upper neighboring sample C, and the upper neighboring sample D are integer samples, and the upper reference sample 610 may be generated based on sample values of the upper neighboring sample A, the upper neighboring sample B, the upper neighboring sample C, and the upper neighboring sample D. Likewise, left neighboring samples positioned in a prediction direction of the current block may be derived based on a position of the left reference sample, and a left reference sample may be generated based on the left neighboring samples.

When there is a position other than the integer sample position among positions of the upper neighboring sample A, the upper neighboring sample B, the upper neighboring sample C, and the upper neighboring sample D, i.e., when there is a fractional sample of the upper neighboring sample A, the upper neighboring sample B, the upper neighboring sample C, and the upper neighboring sample D, the fractional sample may be derived as shown in the following figure.

Figure 7:
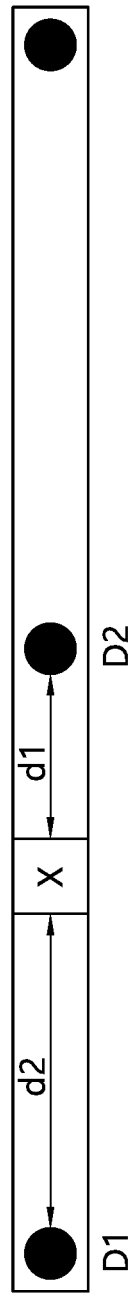
FIG. 7 illustrates an example of deriving the neighboring sample positioned at a fractional sample position.

FIG. 7 illustrates an example of deriving the neighboring sample positioned at a fractional sample position. Referring to FIG. 7, a sample value of a neighboring sample X, which is a fractional sample may be generated by linearly interpolating sample values of integer samples D1 and D2 adjacent to the left and the right of the neighboring sample.

That is, when the upper neighboring sample A, the upper neighboring sample B, the upper neighboring sample C, or the upper neighboring sample D is the fractional sample, the fractional sample may be derived based on upper neighboring samples of an integer sample position adjacent to the fractional sample. The fractional sample may be derived based on the following equation.

$$X=(D1*d1+D2*d2+(d1+d2)/2)/(d1+d2) \quad \text{[Equation 2]}$$

where X may represent the fraction sample, D1 may represent an integer sample adjacent to the left of the fraction sample, D2 may represent an integer sample adjacent to the right of the fraction sample, d1 may represent a distance between D2 and X, and d2 may represent a distance between D1 and X.

A value of each of the upper neighboring samples for generating the upper reference sample may be derived through the above-described method. When the upper neighboring samples of the integer sample position or the fractional sample position are derived, the upper reference sample may be generated based on the upper neighboring samples. The upper reference sample may be generated by allocating the same weight to each upper reference sample as described above. Alternatively, a weight of each upper reference sample may be allocated in consideration of a distance between the current block and the each upper reference sample, and the upper reference sample may be generated based on the each upper reference sample and the weight. Alternatively, a weight of the each upper reference sample may be allocated based on various criteria such as a QP or a size of the current block, and the upper reference sample may be generated based on the each upper reference sample and the weight. Further, the upper reference sample may be generated by substituting the upper neighboring samples and a weight allocated to each of the upper neighboring samples in Equation 1. Further, when there is the fractional sample in the left neighboring samples, the fractional sample may be derived similar to the above description, and the left reference sample may be derived based on the fractional sample.

When a reference sample is generated based on neighboring samples positioned in a prediction direction of the current block, the same weight {¼, ¼, ¼, ¼} may be allocated to neighboring samples used for generating the reference sample or a weight of each neighboring sample may be allocated according to a distance between the each neighboring sample and the current block, as described above. Alternatively, a weight of the each neighboring sample may be allocated according to a size of the current block or a quantization parameter (QP) of the current block. Further, a weight of the each neighboring sample may be allocated based on various criteria. The upper reference sample may be derived based on the upper neighboring samples and the weight allocated to each of the upper neighboring samples. Further, the left reference sample may be derived based on the left neighboring samples and the weight allocated to each of the left neighboring samples.

As described above, when the reference samples are derived based on the 2N number of neighboring samples of a plurality of columns or rows and neighboring samples included in the additional area according to a prediction direction of the current block, samples positioned in the additional area may be generated through padding as described above, but when neighboring samples positioned in the additional area have already been restored, the restored neighboring samples of the additional area may be used, and when the neighboring samples positioned in the additional area are not restored, the neighboring samples may be generated through the above-described padding.

Figure 8:
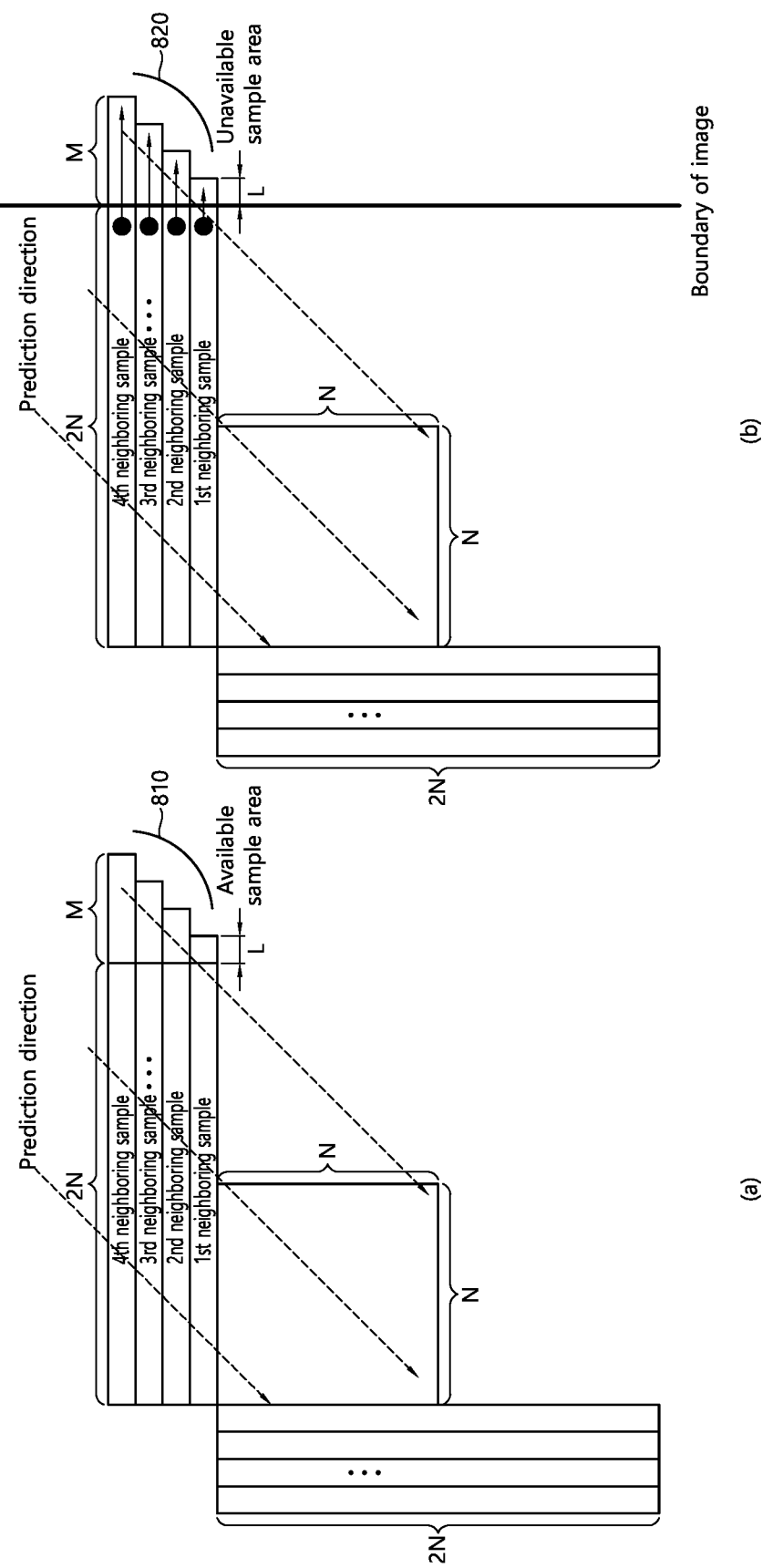
FIG. 8 illustrates an example of generating upper reference samples of the current block based on upper neighboring samples including additionally generated upper neighboring samples.

FIG. 8 illustrates an example of generating upper reference samples of the current block based on upper neighboring samples including additionally generated upper neighboring samples. As described above, an intra-prediction mode of the current block may be derived, and reference samples of the current block may be generated based on neighboring samples positioned in the prediction direction. In this case, as shown in FIG. 8(a), a prediction direction of the current block may be directed from the upper right side to the lower left side, and upper neighboring samples positioned in an additional area 810 shown in FIG. 8(a) may be required for prediction of the current block. When the upper neighboring samples included in the additional area 810 have already been restored, the restored upper neighboring samples may be used for generating the upper reference samples. As shown in FIG. 8(b), when upper neighboring samples positioned in an additional area 820 are not restored, samples positioned in the additional area 820 may be generated by padding a sample value of a rightmost upper neighboring sample among upper neighboring samples of each row. That is, a sample value of samples positioned in the additional area 820 may be derived to be equal to a sample value of the rightmost upper neighboring sample among upper neighboring samples of the each row. Although an additional area of left neighboring samples is not shown in the drawing, similar to a method of deriving the upper neighboring samples included in the additional area 810, left neighboring samples included in an additional area of the left neighboring samples may be derived.

Embodiments of generating the above-described reference sample may be selected based on a prediction direction of a current block. That is, reference samples of the current block may be generated through other methods according to intra-prediction modes.

Figure 9:
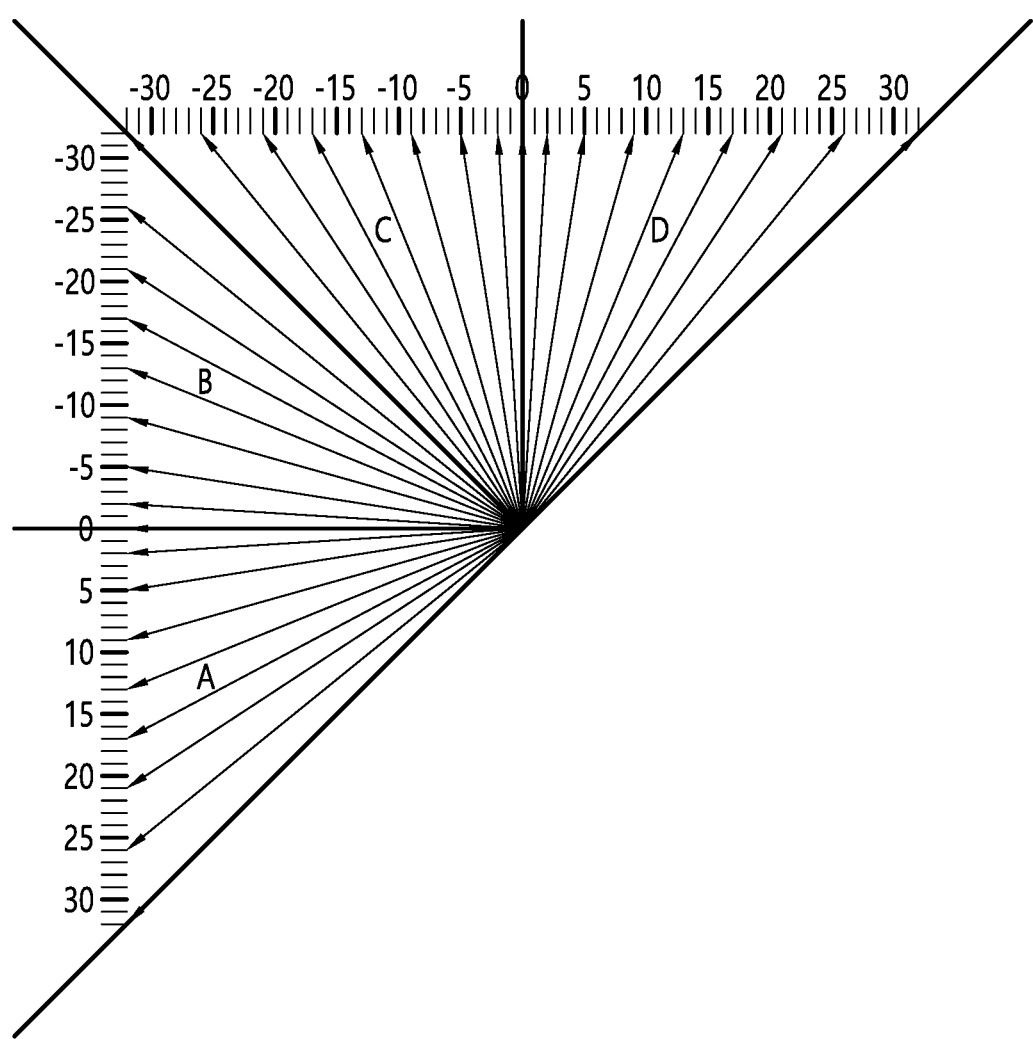
FIG. 9 illustrates an example of dividing intra-prediction modes according to a prediction direction.

FIG. 9 illustrates an example of dividing intra-prediction modes according to a prediction direction. Referring to FIG. 9, the intra-prediction modes may be divided into four areas according to a prediction direction. As shown in FIG. 9, the intra-prediction modes may be included in an area A, an area B, an area C, or an area D according to a prediction direction. Specifically, for example, 2nd to 9th intra-prediction modes of the intra-prediction modes may be included in the area A, 10th to 17th intra-prediction modes may be included in the area B, 18th to 26th intra-prediction modes may be included in the area C, and 27th to 34th intra-prediction modes may be included in the area D. A method of deriving reference samples of the current block based on an intra-prediction mode applied to the current block may be determined.

For example, when an intra-prediction mode included in the area D is applied to the current block, reference samples of the current block may be derived through the method shown in FIG. 8. In other words, the 2N number of upper neighboring samples of the plurality of rows of the current block and upper neighboring samples of an additional area may be generated, and at a position of an upper reference sample of the current block among the 2N number of upper neighboring samples of the plurality of rows and upper neighboring samples of the additional area, an upper reference sample of the current block may be generated based on neighboring samples positioned in a prediction direction. When upper neighboring samples of the additional area have already been restored, the restored upper neighboring samples may be used for generating the reference samples of the current block, and when upper neighboring samples of the additional area are not restored, the upper neighboring samples may be generated by padding a sample value of a rightmost upper neighboring sample among the 2N number of upper neighboring samples of each row.

Figure 10:
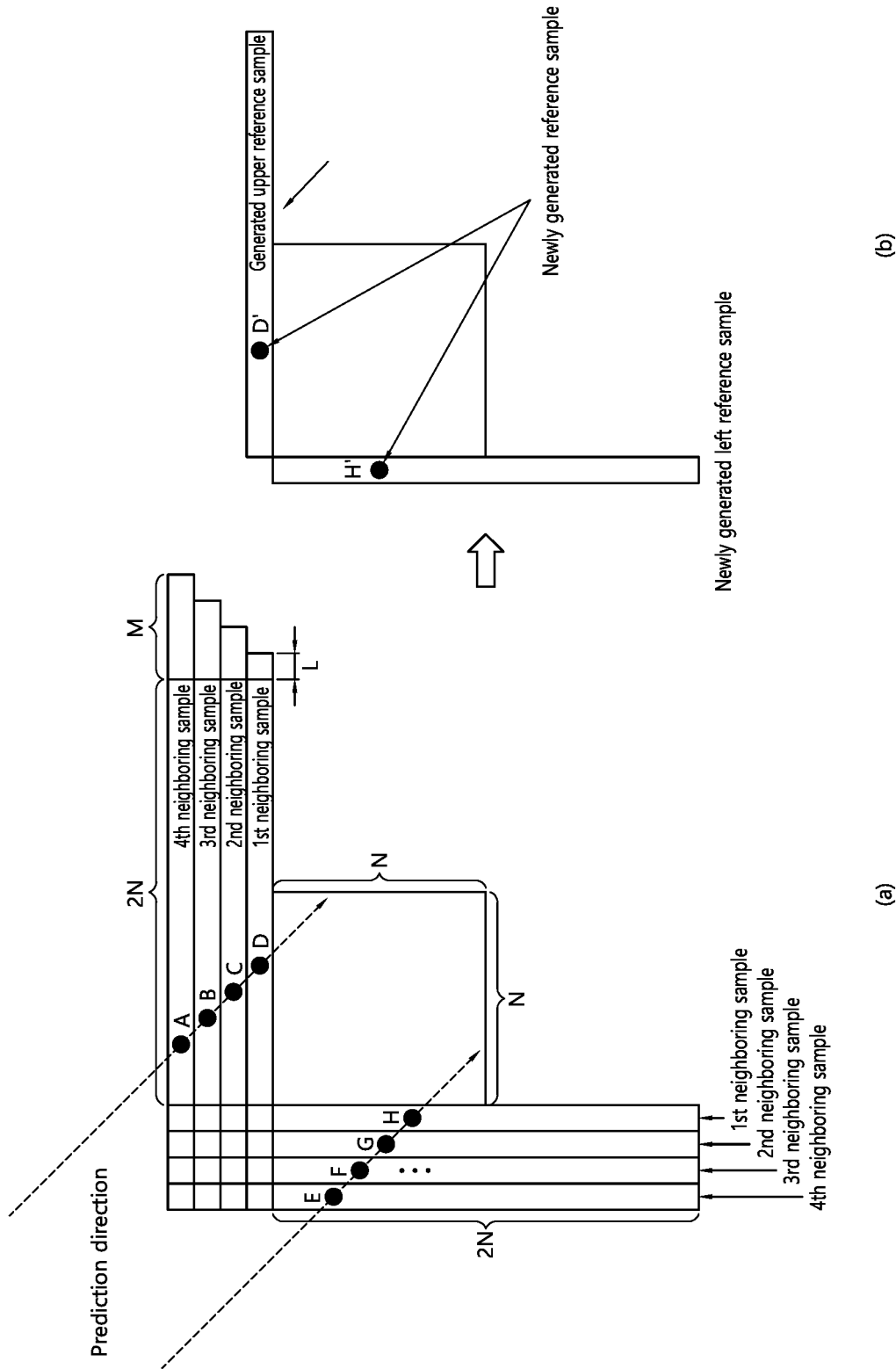
FIG. 10 illustrates an example of generating upper reference samples of the current block based on upper neighboring samples including additionally generated upper neighboring samples.

As another example, when an intra-prediction mode included in the area C is applied to the current block, reference samples of the current block may be generated, as shown in FIG. 10.

FIG. 10 illustrates an example of generating upper reference samples of the current block based on upper neighboring samples including additionally generated upper neighboring samples. When an upper reference sample D' shown in FIG. 10(b) is generated, D' may be generated based on upper neighboring samples A, B, C, and D at positions corresponding to a prediction direction of the current block at a position of the D' shown in FIG. 10(a). When all positions of the upper neighboring samples A, B, C, and D are integer sample positions, i.e., when all of A, B, C, and D are integer samples, D' may be generated based on sample values of A, B, C, and D. When there is a sample of a fractional sample position among the positions of the upper neighboring samples A, B, C and D, i.e., when there is a fractional sample among A, B, C and D, sample values of integer samples adjacent to the left and right of the fractional sample may be generated by linear interpolation, and the D' may be generated based on the generated fractional sample, as described above. Further, at a position of H' shown in FIG. 10(a), the H' may be generated based on the upper neighboring samples E, F, G, and H at positions corresponding to a prediction direction of the current block. When all positions of the upper neighboring samples E, F, G, and H are integer sample positions, i.e., when all of H, F, G, and H are integer samples, H' may be generated based on sample values of E, F, G, and H. When there is a sample of the fractional sample position among the positions of the upper neighboring samples E, F, G and H, i.e., when there is a fractional sample among E, F, G, and H, sample values of integer samples adjacent to the left and right of the fractional sample may be generated by linearly interpolating and the H' may be generated based on the generated fractional sample, as described above.

When an intra-prediction mode included in the area B is applied to the current block and when an intra-prediction mode included in the area C is applied to the current block, reference samples of the current block may be generated through the same method as that of deriving reference samples of the current block. Further, when an intra-prediction mode included in the area A is applied to the current block and when an intra-prediction mode included in the area D is applied to the current block, reference samples of the current block may be generated through the same method as that of deriving reference samples of the current block.

Figure 11:
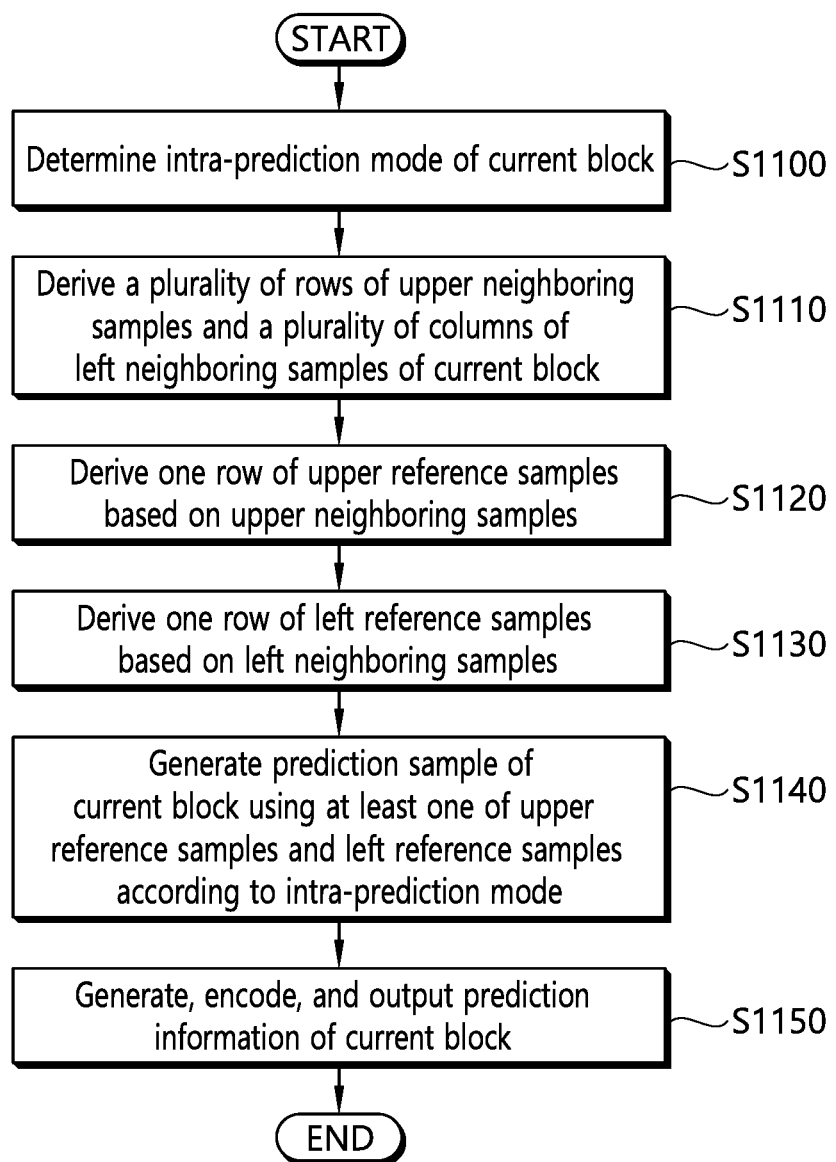
FIG. 11 schematically illustrates a video encoding method by an encoding device according to the present invention.

FIG. 11 schematically illustrates a video encoding method by an encoding device according to the present invention. The method disclosed in FIG. 11 may be performed by the encoding device disclosed in FIG. 1. Specifically, for example, S1100 to S1140 of FIG. 11 may be performed by a prediction unit of the encoding device, and S1150 may be performed by an entropy encoding unit of the encoding device.

The encoding device determines an intra-prediction mode of a current block (S1100). The encoding device may perform various intra-prediction modes to derive an intra-prediction mode having an optimal RD cost as an intra-prediction mode of the current block. The intra-prediction mode may be one of two non-directional prediction modes and 33 directional prediction modes. As described above, the two non-directional prediction modes may include an intra-DC mode and an intra-planar mode.

The encoding device derives a plurality of rows of upper neighboring samples and a plurality of columns of left neighboring samples of the current block (S1110). The encoding device may derive a plurality of rows of upper neighboring samples of the current block. For example, the encoding device may derive 4 rows of upper neighboring samples of the current block. Further, for example, when a size of the current block is N×N, the encoding device may derive the 2N number of upper neighboring samples in each row of the plurality of rows. The 2N number of upper neighboring samples of each row may be referred to as first upper neighboring samples.

An upper reference sample may be derived based on specific upper neighboring samples derived based on a position of the upper reference sample and a prediction direction of the intra-prediction mode of the current block, as described later. In this case, upper neighboring samples other than the first upper neighboring samples may be used for deriving the upper reference sample according to a prediction direction of the current block.

For example, when a size of the current block is N×N, the number of upper neighboring samples of the n-th row among the plurality of rows of upper neighboring samples may be more than 2N. As another example, when the n-th row is a first row, the number of upper neighboring samples of the n-th row is 2N, and the number of upper neighboring samples of the (n+1)th row may be more than 2N. Further, the number of upper neighboring samples of the n-th row among a plurality of rows of upper neighboring samples of the current block may be smaller than that of upper neighboring samples of the (n+1)th row. Specifically, the number of upper neighboring samples of the (n+1)th row may be more than 2N, and the upper neighboring samples after the 2N-th upper neighboring sample among the upper neighboring samples of the (n+1)th row may be derived by padding the 2N-th upper neighboring sample among the upper neighboring samples of the (n+1)th row. Alternatively, before the prediction sample of the current block is generated, when reconstructed samples corresponding to upper neighboring samples after the 2N-th upper neighboring sample among the upper neighboring samples of the (n+1)th row are generated, the reconstructed samples may be derided as upper neighboring samples after the 2N-th upper neighboring sample.

As another example, when a size of the current block is N×N, the encoding device may derive a second upper neighboring sample of each row based on a prediction direction of the current block. Here, the second upper neighboring sample may represent upper neighboring samples other than the first upper neighboring sample of each row. The number of second upper neighboring samples of each row may be determined based on the prediction direction. The second upper neighboring sample of each row may be derived by padding a second upper neighboring sample positioned at the rightmost side among the first upper neighboring samples of the each row. Alternatively, before a prediction sample of the current block is generated, when a reconstructed sample of the second upper neighboring sample is generated, the reconstructed sample may be derived as the second upper neighboring sample, and before the prediction sample of the current block is generated, when a reconstructed sample of the second upper neighboring sample is not generated, the second upper neighboring sample of each row may be derived by padding the second upper neighboring sample positioned at the rightmost side among the first upper neighboring samples of the each row.

Further, in another example, the encoding device may derive a plurality of columns of left neighboring samples of the current block. For example, the encoding device may derive four columns of left neighboring samples of the current block. Further, for example, when a size of the current block is N×N, the encoding device may derive the 2N number of left neighboring samples in each column of the plurality of columns. The 2N number of left neighboring samples of each column may be referred to as first left neighboring samples.

A left reference sample may be derived based on specific left neighboring samples derived based on a position of the left reference sample and a prediction direction of the intra-prediction mode of the current block, as described later. In this case, left neighboring samples other than the first left neighboring samples may be used for deriving the left reference sample according to a prediction direction of the current block.

For example, when a size of the current block is N×N, the number of the n-th column of left neighboring samples among the plurality of columns of left neighboring samples may be more than 2N. In another example, when the n-th column is a first column, the number of the n-th column of left neighboring samples is 2N, and the number of the (n+1)th column of left neighboring samples may be more than 2N. Further, the number of the n-th column of left neighboring samples among a plurality of columns of left neighboring samples of the current block may be smaller than that of the (n+1)th column of left neighboring samples. Specifically, the number of the (n+1)th column of left neighboring samples may be more than 2N, and left neighboring samples after the 2N-th left neighboring sample among the (n+1)th column of left neighboring samples may be derived by padding the 2N-th left neighboring sample among the (n+1)th column of left neighboring samples. Alternatively, before the prediction sample of the current block is generated, when reconstructed samples corresponding to left neighboring samples after the 2N-th left neighboring sample among the (n+1)th column of left neighboring samples are generated, the reconstructed samples may be derived as left neighboring samples after the 2N-th left neighboring sample.

As another example, when a size of the current block is N×N, the encoding device may derive a second left neighboring sample of each column based on a prediction direction of the current block. Here, the second left neighboring sample may represent a left neighboring sample other than the first left neighboring sample of each row. The number of second left neighboring samples of each column may be determined based on the prediction direction. The second left neighboring sample of each column may be derived by padding a second left neighboring sample positioned at the lowermost side among first left neighboring samples of each column. Alternatively, before a prediction sample of the current block is generated, when a reconstructed sample of the second left neighboring sample is generated, the reconstructed sample may be derived as the second left neighboring sample, and before a prediction sample of the current block is generated, when a reconstructed sample of the second left neighboring sample is not generated, the second left neighboring sample of each column may be derived by padding a second left neighboring sample positioned at the lowermost side among the first left neighboring samples of the each column.

The encoding device derives one row of upper reference samples based on the upper neighboring samples (S1120). The encoding device may derive one row of upper reference samples based on the plurality of rows of upper neighboring samples.

For example, an upper reference sample positioned in an x-th column among the upper reference samples may be derived based on upper neighboring samples positioned in the x-th column among the upper neighboring samples. In this case, an average value of sample values of the upper neighboring samples positioned in the x-th column may be derived as a sample value of the upper reference sample positioned in the x-th column. Further, weights of the upper neighboring samples positioned in the x-th column may be derived, and the upper reference samples positioned in the x-th column may be derived based on the weights and the upper neighboring samples positioned in the x-th column. When weights of the upper neighboring samples positioned in the x-th column are derived, the upper reference sample may be derived based on Equation 1.

For example, the weights may be derived based on a distance between the upper neighboring samples and the upper reference sample positioned in the x-th column That is, a weight of a corresponding upper neighboring sample among the upper neighboring samples positioned in the x-th column may be derived based on a distance between the corresponding upper neighboring sample and the upper reference sample, and for example, a weight of the corresponding upper neighboring sample may be inversely proportional to a distance between the corresponding upper neighboring sample and the upper reference sample. Specifically, when four rows of upper neighboring samples are derived, weights of the upper neighboring samples may be derived as ½, ¼, ⅛, and ⅛ in order from bottom to top. Alternatively, weights of the upper neighboring samples may be derived as ⅖, ⅖, 1/10, and 1/10 in order from bottom to up.

Further, in another example, the weights may be derived based on a quantization parameter (QP) or a size of the current block. Further, the weights may be derived based on various criteria.

As another example, a first upper reference sample among the upper reference samples may be derived based on specific upper neighboring samples derived based on a position of the first upper reference sample and a prediction direction of the current block. Specifically, specific upper neighboring samples positioned in a prediction direction of the current block may be derived based on the position of the upper reference sample, and the upper reference sample may be derived based on the specific upper neighboring samples. In this case, an average value of sample values of the specific upper neighboring samples may be derived as a sample value of the first upper reference sample. Further, weights of the specific upper neighboring samples may be derived, and the first upper reference sample may be derived based on the weights and the specific upper neighboring samples. When weights of the specific upper neighboring samples are derived, the first upper reference sample may be derived based on Equation 1

For example, the weights may be derived based on a distance between the specific upper neighboring samples and the first upper reference sample. That is, a weight of a corresponding specific upper neighboring sample among the specific upper neighboring samples may be derived based on a distance between the corresponding specific upper neighboring sample and the first upper reference sample, and for example, a weight of a corresponding specific upper neighboring sample may be inversely proportional to a distance between the corresponding specific upper neighboring sample and the first upper reference sample.

Further, in another example, the weights may be derived based on a quantization parameter (QP) or a size of the current block. Further, the weights may be derived based on various criteria.

When the specific upper neighboring samples derived based on a prediction direction of the current block include an upper neighboring sample, which is a fractional sample, a sample value of the upper neighboring sample, which is the fractional sample are the fractional samples may be derived through linear interpolation between sample values of integer samples adjacent to the left and right of the upper neighboring sample, which is the fractional sample. For example, a sample value of the upper neighboring sample, which is the fractional sample may be derived based on Equation 2.

A method of deriving the upper reference samples based on an intra-prediction mode of the current block may be determined. For example, when the intra-prediction mode of the current block is a mode having a prediction angle larger than that of a vertical mode, i.e., when the intra-prediction mode of the current block is one of 27th to 34th intra-prediction modes, the corresponding upper reference sample of the upper reference samples may be derived based on specific upper neighboring samples positioned in a prediction direction of the current block based on a position of the corresponding upper reference sample. Here, the vertical mode may correspond to a 26th intra-prediction mode. Further, when the intra-prediction mode of the current block is a mode having a prediction angle smaller than or equal to that of the vertical mode, i.e., when the intra-prediction mode of the current block is one of 18th to 26th intra-prediction modes, the corresponding upper reference sample of the upper reference samples may be derived based on upper neighboring samples positioned at the same column as that of the corresponding upper reference sample.

The encoding device derives one row of left reference samples based on the left neighboring samples (S1130). The encoding device may derive one column of left reference samples based on the plurality of columns of left neighboring samples.

For example, a left reference sample positioned in a y-th row among the left reference samples may be derived based on left neighboring samples positioned in the y-th row among the left neighboring samples. In this case, an average value of sample values of the left neighboring samples positioned in the y-th row may be derived as a sample value of the left reference sample positioned in the y-th row. Further, weights of the left neighboring samples positioned in the y-th row may be derived, and the left reference sample positioned in the y-th row may be derived based on the weights and the left neighboring samples positioned in the y-th row. When weights of the left neighboring samples positioned in the y-th row are derived, the left reference sample may be derived based on Equation 1.

For example, the weights may be derived based on a distance between the left neighboring samples and the left reference sample positioned in the y-th row. That is, a weight of a corresponding left neighboring sample among the left neighboring samples positioned in the y-th row may be derived based on a distance between the corresponding left neighboring sample and the left reference sample, and for example, a weight of a corresponding left neighboring sample may be inversely proportional to a distance between the corresponding left neighboring sample and the left reference sample. Specifically, when four columns of left neighboring samples are derived, weights of the left neighboring samples may be derived as ½, ¼, ⅛, and ⅛ in order from the right to the left. Alternatively, weights of the left neighboring samples may be derived as ⅖, ⅖, 1/10, and 1/10 in order from the right to the left.

Further, in another example, the weights may be derived based on a quantization parameter (QP) or a size of the current block. Further, the weights may be derived based on various criteria.

As another example, a first left reference sample of the left reference samples may be derived based on specific left neighboring samples derived based on a position of the first left reference sample and a prediction direction of the current block. Specifically, specific left neighboring samples positioned in a prediction direction of the current block may be derived based on a position of the left reference sample, and the left reference sample may be derived based on the specific left neighboring samples. In this case, an average value of sample values of the specific left neighboring samples may be derived as a sample value of the first left reference sample. Further, weights of the specific left neighboring samples may be derived, and the first left reference sample may be derived based on the weights and the specific left neighboring samples. When weights of the specific left neighboring samples are derived, the first left reference sample may be derived based on Equation 1.

For example, the weights may be derived based on a distance between the specific left neighboring samples and the first left reference sample. That is, a weight of the corresponding specific left neighboring sample among the specific left neighboring samples may be derived based on a distance between the corresponding specific left neighboring sample and the first left reference sample, and for example, a weight of the corresponding specific left neighboring sample may be inversely proportional to a distance between the corresponding specific left neighboring sample and the first left reference sample.

Further, in another example, the weights may be derived based on a quantization parameter (QP) or a size of the current block. Further, the weights may be derived based on various criteria.

When the specific left neighboring samples derived based on a prediction direction of the current block include a left neighboring sample, which is a fractional sample, a sample value of the left neighboring sample, which is the fractional sample may be derived through linear interpolation between sample values of integer samples adjacent to the left and right of the left neighboring sample, which is the fractional sample. For example, a sample value of the left neighboring sample, which is the fractional sample may be derived based on Equation 2.

A method of deriving the left reference samples based on an intra-prediction mode of the current block may be determined. For example, when an intra-prediction mode of the current block is a mode having a prediction angle larger than that of a horizontal mode, i.e., when an intra-prediction mode of the current block is one of 2nd to 9th intra-prediction modes, a corresponding left reference sample of the left reference samples may be derived based on specific left neighboring samples positioned in a prediction direction of the current block based on a position of the corresponding left reference sample. Here, the horizontal mode may correspond to a 10th intra-prediction mode. Further, when an intra-prediction mode of the current block is a mode having a prediction angle smaller than or equal to that of a horizontal mode, i.e., when an intra-prediction mode of the current block is one of 10th to 17th intra-prediction modes, a corresponding left reference sample of the left reference samples may be derived based on left neighboring samples positioned in the same row as that of the corresponding left reference sample.

The encoding device generates a prediction sample of the current block using at least one of the upper reference samples and the left reference samples according to the intra-prediction mode (S1140). The encoding device may generate the prediction sample based on an upper reference sample or a left reference sample positioned in a prediction direction of the intra-prediction mode based on a position of the prediction sample.

The encoding device generates, encodes, and outputs prediction information of the current block (S1150). The encoding device may encode information on an intra-prediction mode of the current block and output the encoded information in a bitstream form. The encoding device may generate information on the intra-prediction mode representing the intra-prediction mode, and encode the generated information to output the encoded information in a bitstream form. The information on the intra-prediction mode may include information directly indicating an intra-prediction mode of the current block or may include information indicating any one candidate in an intra-prediction mode candidate list derided based on an intra-prediction mode of a left block or an upper block of the current block.

Figure 12:
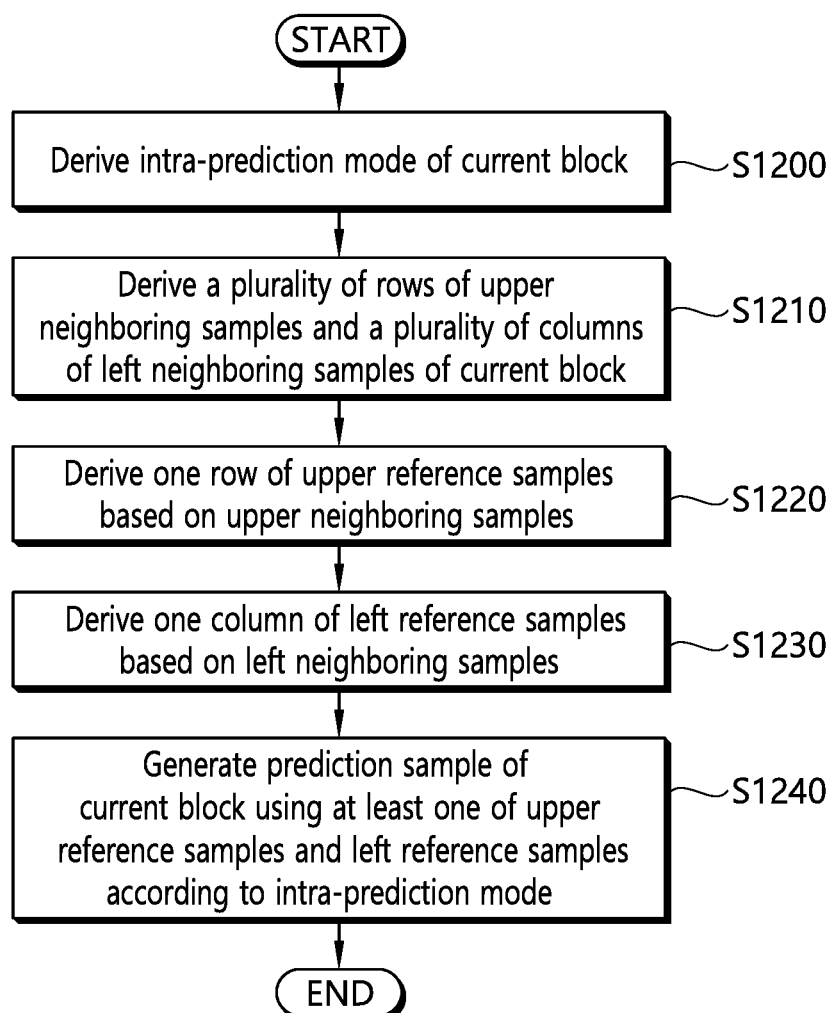
FIG. 12 schematically illustrates a video decoding method by a decoding device according to the present invention.

FIG. 12 schematically illustrates a video decoding method by a decoding device according to the present invention. A method disclosed in FIG. 12 may be performed by the decoding device disclosed in FIG. 2. Specifically, for example, S1200 to S1240 of FIG. 12 may be performed by a prediction unit of the decoding device.

The decoding device derives an intra-prediction mode of a current block (S1200). The decoding device may obtain prediction information on the current block through bitstream. The prediction information may include information that directly indicates an intra-prediction mode of the current block or information indicating any one candidate in an intra-prediction mode candidate list derived based on an intra-prediction mode of a left block or an upper block of the current block. The decoding device may derive an intra-prediction mode of the current block based on the obtained prediction information. The intra-prediction mode may be one of two non-directional prediction modes and 33 directional prediction modes. As described above, the two non-directional prediction modes may include an intra-DC mode and an intra-planar mode.

The decoding device derives a plurality of rows of upper neighboring samples and a plurality of columns of left neighboring samples of the current block (S1210). The decoding device may derive a plurality of rows of upper neighboring samples of the current block. For example, the decoding device may derive four rows of upper neighboring samples of the current block. Further, for example, when a size of the current block is N×N, the decoding device may derive the 2N number of upper neighboring samples in each row of the plurality of rows. The 2N number of upper neighboring samples of the each row may be referred to as first upper neighboring samples.

An upper reference sample may be derived based on specific upper neighboring samples derived based on a position of the upper reference sample and a prediction direction of the intra-prediction mode of the current block, as described later. In this case, upper neighboring samples other than the first upper neighboring samples may be used for deriving the upper reference sample according to a prediction direction of the current block.

For example, when a size of the current block is N×N, the number of upper neighboring samples of the n-th row among the plurality of rows of upper neighboring samples may be more than 2N. As another example, when the n-th row is a first row, the number of upper neighboring samples of the n-th row is 2N, and the number of upper neighboring samples of the (n+1)th row may be more than 2N. Further, the number of upper neighboring samples of the n-th row among a plurality of rows of upper neighboring samples of the current block may be smaller than that of upper neighboring samples of the (n+1)th row. Specifically, the number of upper neighboring samples of the (n+1)th row may be more than 2N, and upper neighboring samples after a 2N-th upper neighboring sample among the upper neighboring samples of the (n+1)th row may be derived by padding the 2N-th upper neighboring sample among the upper neighboring samples of the (n+1)th row. Alternatively, before a prediction sample of the current block is generated, when reconstructed samples corresponding to upper neighboring samples after the 2N-th upper neighboring sample among the upper neighboring samples of the (n+1)-th row are generated, the reconstructed samples may be derived as upper neighboring samples after the 2N-th upper neighboring sample.

As another example, when a size of the current block is N×N, the decoding device may derive a second upper neighboring sample of each row based on a prediction direction of the current block. Here, the second upper neighboring sample may represent an upper neighboring sample of each row other than the first upper neighboring sample. The number of second upper neighboring samples of the each row may be determined based on the prediction direction. The second upper neighboring sample of the each row may be derived by padding a first upper neighboring sample positioned at the rightmost side among the first upper neighboring samples of the each row. Alternatively, before a prediction sample of the current block is generated, when a reconstructed sample of the second upper neighboring sample is generated, the reconstructed sample may be derived as the second upper neighboring sample, and before a prediction sample of the current block is generated, when a reconstructed sample of the second upper neighboring sample is not generated, the second upper neighboring sample of the each row may be derived by padding a first upper neighboring sample positioned at the rightmost side among first upper neighboring samples of the each row.

Further, in another example, the decoding device may derive a plurality of columns of left neighboring samples of the current block. For example, the decoding device may derive four columns of left neighboring samples of the current block. Further, for example, when a size of the current block is N×N, the decoding device may derive the 2N number of left neighboring samples in each column of the plurality of columns. The 2N number of left neighboring samples of each column may be referred to as first left neighboring samples.

A left reference sample may be derived based on specific left neighboring samples derived based on a position of the left reference sample and a prediction direction of the intra-prediction mode of the current block, as described later. In this case, left neighboring samples other than the first left neighboring samples may be used for deriving the left reference sample according to a prediction direction of the current block.

For example, when a size of the current block is N×N, the number of left neighboring samples of the n-th column among the plurality of columns of left neighboring samples may be more than 2N. In another example, when the n-th column is a first column, the number of left neighboring samples of the n-th column is 2N, and the number of left neighboring samples of the (n+1)th column may be more than 2N. Further, the number of left neighboring samples of the n-th column among the plurality of columns of left neighboring samples of the current block may be smaller than that of left neighboring samples of the (n+1)th column. Specifically, the number of left neighboring samples of the (n+1)th column may be more than 2N, and left neighboring samples after a 2N-th left neighboring sample among the left neighboring samples of the (n+1)th column may be derided by padding the 2N-th left neighboring sample among the left neighboring samples of the (n+1)th column. Alternatively, before the prediction sample of the current block is generated, when reconstructed samples corresponding to left neighboring samples after the 2N-th left neighboring sample among the left neighboring samples of the (n+1)th column are generated, the reconstructed samples may be derived to left neighboring samples after the 2N-th left neighboring sample.

As another example, when a size of the current block is N×N, the decoding device may derive a second left neighboring sample of each column based on a prediction direction of the current block. The number of second left neighboring samples of each column may be determined based on the prediction direction. The second left neighboring sample of each column may be derived by padding a first left neighboring sample positioned at the lowermost side among the first left neighboring samples of the each column. Alternatively, before a prediction sample of the current block is generated, when a reconstructed sample of the second left neighboring sample is generated, the reconstructed sample may be derived to the second left neighboring sample, and before the prediction sample of the current block is generated, when a reconstructed sample of the second left neighboring sample is not generated, the second left neighboring sample of each column may be derived by padding a first left neighboring sample positioned at the lowermost side among the first left neighboring samples of the each column.

The decoding device derives one row of upper reference samples based on the upper neighboring samples (S1220). The decoding device may derive one row of upper reference samples based on the plurality of rows of upper neighboring samples.

For example, an upper reference sample positioned in an x-th column among the upper reference samples may be derived based on upper neighboring samples positioned in the x-th column among the upper neighboring samples. In this case, an average value of sample values of the upper neighboring samples positioned in the x-th column may be derived as a sample value of the upper reference sample positioned in the x-th column. Further, weights of the upper neighboring samples positioned in the x-th column may be derived, and the upper reference samples positioned in the x-th column may be derived based on the weights and the upper neighboring samples positioned in the x-th column. When weights of the upper neighboring samples positioned in the x-th column are derived, the upper reference sample may be derived based on Equation 1.

For example, the weights may be derived based on a distance between the upper neighboring samples and the upper reference sample positioned in the x-th column That is, a weight of the corresponding upper neighboring sample among the upper neighboring samples positioned in the x-th column may be derived based on a distance between the corresponding upper neighboring sample and the upper reference sample, and for example, a weight of the corresponding upper neighboring sample may be inversely proportional to a distance between the corresponding upper neighboring sample and the upper reference sample. Specifically, when four rows of upper neighboring samples are derived, weights of the upper neighboring samples may be derived as ½, ¼, ⅛, and ⅛ in order from bottom to top. Alternatively, weights of the upper neighboring samples may be derived as ⅖, ⅖, 1/10, and 1/10 in order from bottom to up.

Further, in another example, the weights may be derived based on a quantization parameter (QP) or a size of the current block. Further, the weights may be derived based on various criteria.

As another example, a first upper reference sample among the upper reference samples may be derived based on specific upper neighboring samples derived based on a position of the first upper reference sample and a prediction direction of the current block. Specifically, specific upper neighboring samples positioned in a prediction direction of the current block may be derived based on a position of the upper reference sample, and the upper reference sample may be derived based on the specific upper neighboring samples. In this case, an average value of sample values of the specific upper neighboring samples may be derived as a sample value of the first upper reference sample. Further, weights of the specific upper neighboring samples may be derived, and the first upper reference sample may be derived based on the weights and the specific upper neighboring samples. When weights of the specific upper neighboring samples are derived, the first upper reference sample may be derived based on Equation 1.

For example, the weights may be derived based on a distance between the specific upper neighboring samples and the first upper reference sample. That is, a weight of a corresponding specific upper neighboring sample among the specific upper neighboring samples may be derived based on a distance between the corresponding specific upper neighboring sample and the first upper reference sample, and for example, a weight of the corresponding specific upper neighboring sample may be inversely proportional to a distance between the corresponding specific upper neighboring sample and the first upper reference sample.

Further, in another example, the weights may be derived based on a quantization parameter (QP) or a size of the current block. Further, the weights may be derived based on various criteria.

When the specific upper neighboring samples derived based on a prediction direction of the current block include an upper neighboring sample, which is a fractional sample, a sample value of the upper neighboring samples, which is the fractional sample are the fractional samples may be derived through linear interpolation between sample values of integer samples adjacent to the left and right of the upper neighboring sample, which is the fractional sample. For example, a sample value of the upper neighboring sample, which is the fractional sample may be derived based on Equation 2.

A method of deriving the upper reference samples based on an intra-prediction mode of the current block may be determined. For example, when an intra-prediction mode of the current block is a mode having a prediction angle larger than that of a vertical mode, i.e., when an intra-prediction mode of the current block is one of 27th to 34th intra-prediction modes, a corresponding upper reference sample of the upper reference samples may be derived based on specific upper neighboring samples positioned in a prediction direction of the current block based on a position of the corresponding upper reference sample. Here, the vertical mode may correspond to a 26th intra-prediction mode. When an intra-prediction mode of the current block is a mode having a prediction angle smaller than or equal to that of a vertical mode, i.e., when an intra-prediction mode of the current block is one of 18th to 26th intra-prediction modes, the corresponding upper reference sample of the upper reference samples may be derived based on upper neighboring samples positioned in the same column as that of the corresponding upper reference sample.

The decoding device derives one row of left reference samples based on the left neighboring samples (S1230). The decoding device may derive one row of left reference samples based on the plurality of columns of left neighboring samples.

For example, a left reference sample positioned in a y-th row among the left reference samples may be derived based on left neighboring samples positioned in the y-th row among the left neighboring samples. In this case, an average value of sample values of the left neighboring samples positioned in the y-th row may be derived as a sample value of the left reference sample positioned in the y-th row. Further, weights of the left neighboring samples positioned in the y-th row may be derived, and the left reference sample positioned in the y-th row may be derived based on the weights and the left neighboring samples positioned in the y-th row. When weights of the left neighboring samples positioned in the y-th row are derived, the left reference sample may be derived based on Equation 1.

For example, the weights may be derived based on a distance between the left neighboring samples and the left reference sample positioned in the y-th row. That is, a weight of the corresponding left neighboring sample among the left neighboring samples positioned in the y-th row may be derived based on a distance between the corresponding left neighboring sample and the left reference sample, and for example, a weight of the corresponding neighboring sample may be inversely proportional to a distance between the corresponding left neighboring sample and the left reference sample. Specifically, when four columns of left neighboring samples are derived, weights of the left neighboring samples may be derived as ½, ¼, ⅛, and ⅛ in order from the right to the left. Alternatively, weights of the left neighboring samples may be derived as ⅖, ⅖, 1/10, and 1/10 in order from the right to the left.

Further, in another example, the weights may be derived based on a quantization parameter (QP) or a size of the current block. Further, the weights may be derived based on various criteria.

As another example, a first left reference sample among the left reference samples may be derived based on specific left neighboring samples derived based on a position of the first left reference sample and a prediction direction of the current block. Specifically, specific left neighboring samples positioned in a prediction direction of the current block may be derived based on a position of the left reference sample, and the left reference sample may be derived based on the specific left neighboring samples. In this case, an average value of sample values of the specific left neighboring samples may be derived as a sample value of the first left reference sample. Further, weights of the specific left neighboring samples may be derived, and the first left reference sample may be derived based on the weights and the specific left neighboring samples. When weights of the specific left neighboring samples are derived, the first left reference sample may be derived based on Equation 1.

For example, the weights may be derived based on a distance between the specific left neighboring samples and the first left reference sample. That is, a weight of the corresponding specific left neighboring sample among the specific left neighboring samples may be derived based on a distance between the corresponding specific left neighboring sample and the first left reference sample, and for example, a weight of the corresponding specific left neighboring sample may be inversely proportional to a distance between the corresponding specific left neighboring sample and the first left reference sample.

Further, in another example, the weights may be derived based on a quantization parameter (QP) or a size of the current block. Further, the weights may be derived based on various criteria.

When the specific left neighboring samples derived based on a prediction direction of the current block include a left neighboring sample, which is a fractional sample, a sample value of the left neighboring sample, which is the fractional sample may be derived through linear interpolation between sample values of integer samples adjacent to the left and right of the left neighboring sample, which is the fractional sample. For example, a sample value of the left neighboring sample, which is the fractional sample may be derived based on Equation 2.

A method of deriving the left reference samples based on an intra-prediction mode of the current block may be determined. For example, when an intra-prediction mode of the current block is a mode having a prediction angle larger than that of a horizontal mode, i.e., when an intra-prediction mode of the current block is one of 2nd to 9th intra-prediction modes, a corresponding left reference sample of the left reference samples may be derived based on specific left neighboring samples positioned in a prediction direction of the current block based on a position of the corresponding left reference sample. Here, the horizontal mode may correspond to a 10th intra-prediction mode. Further, when an intra-prediction mode of the current block is a mode having a prediction angle smaller than or equal to that of a horizontal mode, i.e., when an intra-prediction mode of the current block is one of 10th to 17th intra-prediction modes, a corresponding left reference sample of the left reference samples may be derived based on left neighboring samples positioned in the same row as that of the corresponding left reference sample.

The decoding device generates a prediction sample of the current block using at least one of the upper reference samples and the left reference samples according to the intra-prediction mode (S1240). The decoding device may generate the prediction sample based on an upper reference sample or a left reference sample positioned in a prediction direction of the intra-prediction mode based on a position of the prediction sample.

Although not shown in the drawing, the decoding device may immediately use the prediction sample as a reconstructed sample according to a prediction mode or may add a residual sample to the prediction sample to generate a reconstructed sample. When there is a residual sample of the target block, the decoding device may receive information about the residual sample of the target block, and the information about the residual sample may be included in information about the pace. The information on the residual sample may include a transform coefficient related to the residual sample. The decoding device may derive the residual sample (or residual sample array) of the target block based on the residual information. The decoding device may generate a reconstructed sample based on the prediction sample and the residual sample, and may derive a reconstructed block or a reconstructed picture based on the reconstructed sample. Thereafter, it is described that the decoding device may apply deblocking filtering and/or an in-loop filtering procedure such as an SAO procedure to the reconstructed picture in order to improve a subjective/objective picture quality, as needed.

According to the present invention, a reference sample of a current block may be derived based on a plurality of neighboring samples, and by performing intra-prediction based on the reference sample, prediction accuracy of the current block can be improved, thereby improving overall coding efficiency.

Further, according to the present invention, a reference sample can be derived based on a plurality of neighboring samples positioned in a prediction direction of an intra-prediction mode of a current block, and by performing intra-prediction based on the reference sample, prediction accuracy of the current block can be improved, thereby improving overall coding efficiency.

Further, according to the present invention, weights of a plurality of neighboring samples can be derived, a reference sample can be derived based on the weights and the neighboring samples, and by performing intra-prediction based on the reference sample, prediction accuracy of the current block can be improved, thereby improving overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A method of decoding video performed by a decoding device, the method comprising: deriving an intra-prediction mode of a current block; deriving upper neighboring samples and left neighboring samples of the current block; and generating a prediction sample of the current block based on the upper neighboring samples and the left neighboring samples and the intra-prediction mode, wherein the upper neighboring samples include upper neighboring samples of a n-th row, wherein the left neighboring samples include left neighboring samples of a n-th column, and wherein, when an upper neighboring sample, which is a fractional sample is included in specific upper neighboring samples derived based on a prediction direction of the current block, a sample value of the upper neighboring sample, which is the fractional sample is derived through linear interpolation between sample values of integer samples adjacent to the left and right of the upper neighboring sample, which is the fractional sample.

2. The method of claim 1, wherein the n is more than 1, wherein the number of the upper neighboring samples of the n-th row is more than 2N.

3. The method of claim 2, wherein upper neighboring samples after an 2N-th upper neighboring sample among the upper neighboring samples of the n-th row are derived by padding a specific upper neighboring sample,
wherein the specific upper neighboring sample is a upper neighboring sample closest to the upper neighboring samples after the 2N-th upper neighboring sample among the upper neighboring samples of the n-th row other than the upper neighboring samples after an 2N-th upper neighboring sample.

4. The method of claim 3, wherein the specific upper neighboring sample is the 2N-th upper neighboring sample among the upper neighboring samples of the n-th row.

5. The method of claim 1, wherein the n is more than 1, wherein the number of the left neighboring samples of the n-th column is more than 2N.

6. The method of claim 5, wherein left neighboring samples after an 2N-th left neighboring sample among the left neighboring samples of the n-th column are derived by padding a specific left neighboring sample,
wherein the specific left neighboring sample is a left neighboring sample closest to the left neighboring samples after the 2N-th left neighboring sample among the left neighboring samples of the n-th column other than the left neighboring samples after an 2N-th left neighboring sample.

7. The method of claim 6, wherein the left neighboring sample is the 2N-th left neighboring sample among the left neighboring samples of the n-th column.

8. The method of claim 1, wherein the number of the upper neighboring samples of the n-th row is smaller than that of upper neighboring samples of an (n+1)th row, when a size of the current block is N×N.

9. The method of claim 8, wherein the number of the (n+1)th row of upper neighboring samples is more than 2N, and
upper neighboring samples after an 2N-th upper neighboring sample among the (n+1)th row of upper neighboring samples are derived by padding the 2N-th upper neighboring sample among the (n+1)th row of upper neighboring samples.

10. The method of claim 8, wherein, before a prediction sample of the current block is generated, when reconstructed samples corresponding to upper neighboring samples after the 2N-th upper neighboring sample among the (n+1)th row of upper neighboring samples are generated, the reconstructed samples are derived as upper neighboring samples after the 2N-th row upper neighboring sample.

11. A method of encoding video performed by an encoding device, the method comprising: determining an intra-prediction mode of a current block; deriving upper neighboring samples and left neighboring samples of the current block; generating a prediction sample of the current block based on the upper reference samples and the left reference samples and the intra-prediction mode; and encoding prediction information of the current block, wherein the upper neighboring samples include upper neighboring samples of a n-th row, wherein the left neighboring samples include left neighboring samples of a n-th column, and wherein, when an upper neighboring sample, which is a fractional sample is included in specific upper neighboring samples derived based on a prediction direction of the current block, a sample value of the upper neighboring sample, which is the fractional sample is derived through linear interpolation between sample values of integer samples adjacent to the left and right of the upper neighboring sample, which is the fractional sample.

12. The method of claim 11, wherein the n is more than 1,
wherein the number of the upper neighboring samples of the n-th row is more than 2N when a size of the current block is N×N.

13. The method of claim 11, wherein the n is more than 1,
wherein the number of the left neighboring samples of the n-th column is more than 2N when a size of the current block is N×N.

14. A non-transitory computer-readable storage medium storing encoded video data comprising information on instructions, when executed, causing a video decoding device to perform operations comprising: deriving an intra-prediction mode of a current block; deriving upper neighboring samples and left neighboring samples of the current block; and generating a prediction sample of the current block based on the upper neighboring samples and the left neighboring samples and the intra-prediction mode, wherein the upper neighboring samples include upper neighboring samples of a n-th row, wherein the left neighboring samples include left neighboring samples of a n-th column, and wherein, when an upper neighboring sample, which is a fractional sample is included in specific upper neighboring samples derived based on a prediction direction of the current block, a sample value of the upper neighboring sample, which is the fractional sample is derived through linear interpolation between sample values of integer samples adjacent to the left and right of the upper neighboring sample, which is the fractional sample.

* * * * *